（12） United States Patent
Hamilton, II et al.

(10) Patent No.: US 8,140,873 B2
(45) Date of Patent: Mar. 20, 2012

(54) USER IMPOSED POWER CONSTRAINTS ON WEB SERVER BASED ON USER PREFERENCES

(75) Inventors: Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 936 days.

(21) Appl. No.: 12/147,932

(22) Filed: Jun. 27, 2008

(65) Prior Publication Data

US 2009/0327775 A1 Dec. 31, 2009

(51) Int. Cl.
*G06F 1/32* (2006.01)
(52) U.S. Cl. ............... 713/320; 713/300; 713/310
(58) Field of Classification Search ............. 713/320, 713/300
See application file for complete search history.

(56) References Cited

U.S. PATENT DOCUMENTS

| | | | |
|---|---|---|---|
| 6,598,029 B1 | 7/2003 | Johnson et al. | |
| 6,631,309 B2 * | 10/2003 | Boies et al. | 700/291 |
| 6,785,592 B1 | 8/2004 | Smith et al. | |
| 6,868,293 B1 * | 3/2005 | Schurr et al. | 700/22 |
| 7,171,287 B2 | 1/2007 | Weiss | |
| 7,313,763 B1 * | 12/2007 | Bisque et al. | 715/736 |
| 7,434,076 B1 * | 10/2008 | Altounian et al. | 713/324 |
| 2004/0098142 A1 | 5/2004 | Warren et al. | |
| 2004/0254899 A1 | 12/2004 | Abe et al. | |
| 2005/0165512 A1 | 7/2005 | Peljto | |
| 2006/0149978 A1 * | 7/2006 | Randall et al. | 713/300 |

\* cited by examiner

*Primary Examiner* — Nitin Patel
(74) *Attorney, Agent, or Firm* — Patrick J. Daugherty; Driggs, Hogg, Daugherty & Del Zoppo Co., LPA

(57) ABSTRACT

Web application users are able to specify power constraints for remote web servers. These may be based on individual performance needs and energy-conservation desires. They enable the user to exercise control over the amount of energy that the web server expends in serving the needs of the user. The invention may employ such features as vertical scaling using power capacity on demand (CUoD) type functionality. The method includes providing a user-interactive interface to enable the user to indicate a preference for power restrictions with respect to its web requests. The user then instructs the web site provider to reduce power consumption in response to the user's request. The user specifies a reduction in overall power consumption for the user's needs, such as instructing the web service provider to use an energy-conserving server to handle the user's web requests, or specifying a acceptable delay or fulfilling the user's web requests.

25 Claims, 3 Drawing Sheets

USER IMPOSED POWER CONSTRAINTS ON WEB SERVER BASED ON USER PREFERENCES

FIELD OF THE INVENTION

The present invention relates to a web user based system and method for the imposition of power restrictions on the services provided to the user by web servers.

BACKGROUND OF THE INVENTION

The power costs relating to information technology (IT) have been steadily increasing, causing some experts to predict that power costs will soon overtake computer hardware costs. Currently, computing workloads are processed within relatively static data centers. Disaster recovery mechanisms exist to transfer data or processing to an alternate site based on an outage at an original data center location.

Grid computing enables the distribution of compute workloads based on available resources. It does not include methods for the determination of processing location based on real-time energy costs.

Equipment power needs are a significant burden for business IT budgets. Most servers are underutilized, indicating that processing capacity may exist in locations with lower energy costs. Not utilizing this capacity causes unnecessary incurred expense for organizations using status quo redistribution techniques.

Accordingly, there exists a need in the art to overcome the deficiencies and limitations described herein above.

SUMMARY OF THE INVENTION

The present invention relates to techniques for a web application user to specify power constraints for remote web servers based on a variety of factors such as individual performance needs and energy conservation desires. The invention may employ such features as vertical scaling using power capacity on demand (CUoD) type functionality.

The invention utilizes two basic architectural steps, involving: 1) a system and method by which a user expresses a desire to "go green" and 2) a system and method that uses such a user expression to reduce power consumption.

The invention relates to a user based system and method for specifying power restriction for the quantum of energy that a remote web site employs to serve the user. The restriction is based on individual performance needs and energy-conservation profiles of the user. The invention employs a user-interactive interface, the capability to enable the user to indicate a preference for power restrictions with respect to its web requests, and a control to enable the web site to reduce power in response to the user's request. The user may select several options for specifying the reduction in overall power consumption for the user's needs. Although not intending to be limiting, among these options are the following:

- The user instructs the web service provider to use an energy-conserving server to handle the user's web requests;
- The user authorizes the web service provider to handle specified user requests at a lower priority;
- The user instructs the web service provider to handle the user's web requests without utilizing additional nodes and CPUs;
- The user specifies an acceptable delay for fulfilling web request;
- The user selects from among annotations on a web site for energy conservation.

The invention also relates to a computer-readable medium and a computer product containing instructions that are implemented on a computer, enabling the user to elect to go green.

Finally, the invention relates to a method for a service provider to deploy a computer program to enable a user to select specific power constraints and to impose these restraints on remote web servers employed by the user.

The invention has utilization in such products or services as Application Software, Web Services, Supervisory Processors and Grid Node Controllers, all of which are well known in the art.

BRIEF DESCRIPTION OF THE DRAWINGS

These and other features of this invention will be more readily understood from the following detailed description of the various aspects of the invention taken in conjunction with the accompanying drawings in which.

Figure 1:
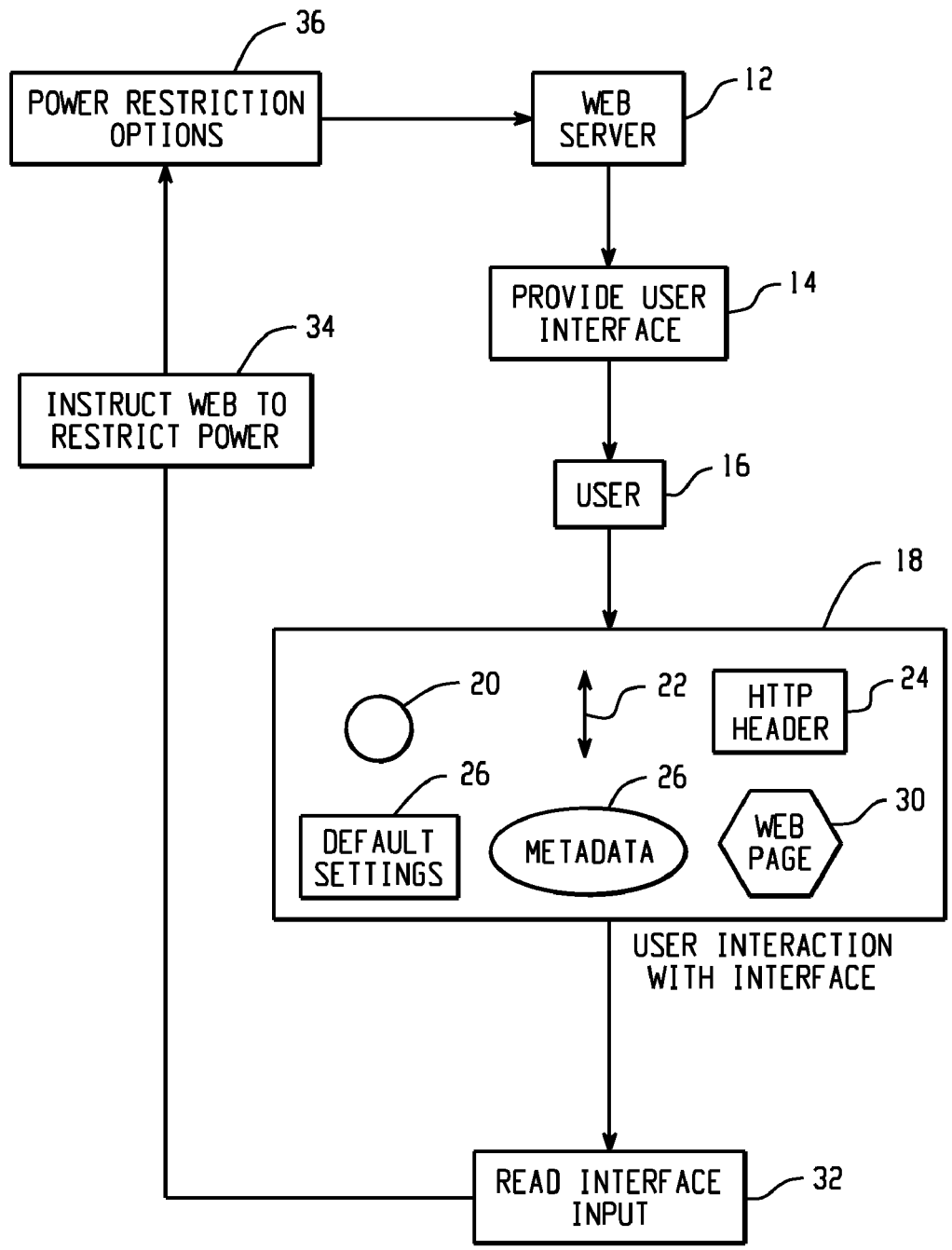
FIG. 1 is a simplified flow diagram of the present invention.

The drawings are not intended to be drawn to scale. Instead, the drawings are merely a schematic representation, not intended to portray specific parameters of the invention. They are intended to depict only typical embodiments of the invention, and therefore should not be considered as limiting the scope of the invention.

DETAILED DESCRIPTION OF THE INVENTION

For purposes of the present invention, the term "power" may be defined as the electric energy resource used by businesses and individual consumers over a given unit of time; and "green computing" may be defined as the study and practice of using computing resources efficiently. Typically, technological systems or computing products that incorporate green computing principles take into account the so-called triple bottom line of economic viability, social responsibility, and environmental impact. One form of green computing includes maximized energy efficiency.

Green computing also is understood to be the science behind efficient computing and performing tasks for a smaller power budget. The government has many large initiatives on environmentally conscious IT programs. In fact, it has indicted that the concept of environmentally responsible IT is referred to as "clean technology," "green computing" or "environmental IT." Examples include operating systems that shut down computer processors when the computers are not in use, computers certified as environmentally sensitive, energy-efficient servers and e-cycling services.

Independent websites provide listings of the most efficient computers, and industry has recognized the importance of efficient computing as witnessed by numerous articles directed to the same. Most of the latest embedded processors include run-time power modes that can be used to scale power consumption. A common one is idle mode which allows a processor core to shut down while peripherals remain active. Event reduction keeps the processor in idle mode as long as possible thereby providing additional power savings. Dynamic clock and voltage adjustment represent yet another example of power reduction that can be employed by a web server.

An embodiment of the invention provides a system that enables a user of a web service to reduce the overall energy footprint required to serve the user's web requests through several methods. For example, a web browser may enable a user to select a green (e.g. energy-conserving) or non-green server that handles the user's web requests. Additionally, a user may transmit a green mode command to enable requests to be handled at lower priority. The user may specify that new nodes and CPUs should not be activated to serve the user's request. Additionally, a user may specify an acceptable delay for web requests in order to reduce power consumption. The interface may reside on the web browser GUI, for example, in the form a switch, dial, or slider. In this manner, the user participates in computational and communication load balancing.

In another aspect of this invention, HTML, XML, or annotations within a web page may be used to specify methods for energy conservation. For example, a web page designer may specify alternate energy saving methods to display and serve the web page objects.

Capacity upgrade on demand (CUoD) is a fast, nondisruptive method of activating "extra" processor capacity, built directly into certain internet servers. It enables a user to activate additional processors and pay only for the new processing power as the users' needs grow. CUoD enables businesses to add processor capacity as needed, permanently activating capacity to respond to increased business demands. It is ideal for nondisruptive, planned growth, for companies to "pay as you grow." There are a number of analogous technologies presently in use for activating additional processors.

On/Off Capacity On Demand responds to temporary increases, adding computing capacity exactly when needed, for business peaks or specific limited times of the year when the extra capacity is needed. As business cycles and other events cause spikes in activity, IT departments can enable additional processors or memory when needed, and disable them as workloads return to normal.

Reserve Capacity On Demand enables businesses to prepay for days of additional processing resources, which can be automatically activated as workloads fluctuate, thereby reducing administration intervention.

Trial Capacity On Demand temporarily evaluates the effect that additional processing & memory capacity could have on performance and business operations. This Capacity On Demand feature is ideal for testing new applications and resources, allowing administrators to test for up to 30 contiguous days of usage. For emergency recovery operations, a user may utilize the Capacity BackUp to divert workloads to backup servers to ensure continued business operations. For off-site disaster recovery, one may run entire workloads for up to 90 days, to respond to unexpected losses of server capabilities.

Each of these server functions requires additional processing power, brought upon by the need to service user and application requests. The present invention addresses methods in which these functions, as well as analogous grid node activation, may be delayed or mitigated through user selection of roles and prioritization.

A Web user may specify a desire to "go green", in other words, to conserve energy, within certain performance bounds. A user may specify conservation desires through interactions with the computing entity, including a graphical interface on the Web browser, a graphical interface on the computer desktop, keyword entry, and/or speech entry.

The following steps shown in FIG. 1 are used to allow the user to specify certain energy conservation measures to be implemented directly with a an input interface 14 to a web user 16. The process starts with the web server 12 providing an input interface 14 for the user 16. The web user 16 then interacts with, and issues instructions to, the interface 18 by appropriate means such as a button 20, a sliding scaler 22 having a range of conservation measures, for example, between 0% and 100% from which the user may select, an HTTP header 24, and a suitable default setting 26, or a web page 30, optionally using metadata 28. Other means, known in the art, or developed in the future, whereby the net user is able to interact with the interface are likewise encompassed within the parameters of the present invention. The interface input is read at 32 in a manner well known in the art.

If the users' the instructions are incorporated into an HTTP header 28, the web server can elect to parse the header or not parse at its choice. The user can utilize metadata to preserve any settings that the user may want to be ongoing. Yet another option is to make conservation selections on a web page supplied to the user either by the server or by an interface provider shown in FIG. 2.

The instructions communicated through the interface may be based on a pre-arranged plan or understanding between the user and the web server. On the other hand, they may be selected from a suitable drop-down menu or may be chosen from a table of options available to the user.

These instructions are sent at 34 to the web server which then reads the interface input at 36. These instructions may include, but are not limited to decreasing the user preferences, requesting a delay in implementing a compute task for the user, or restricting the use of new grids or computer facilities to meet the user's needs.

Figure 2:
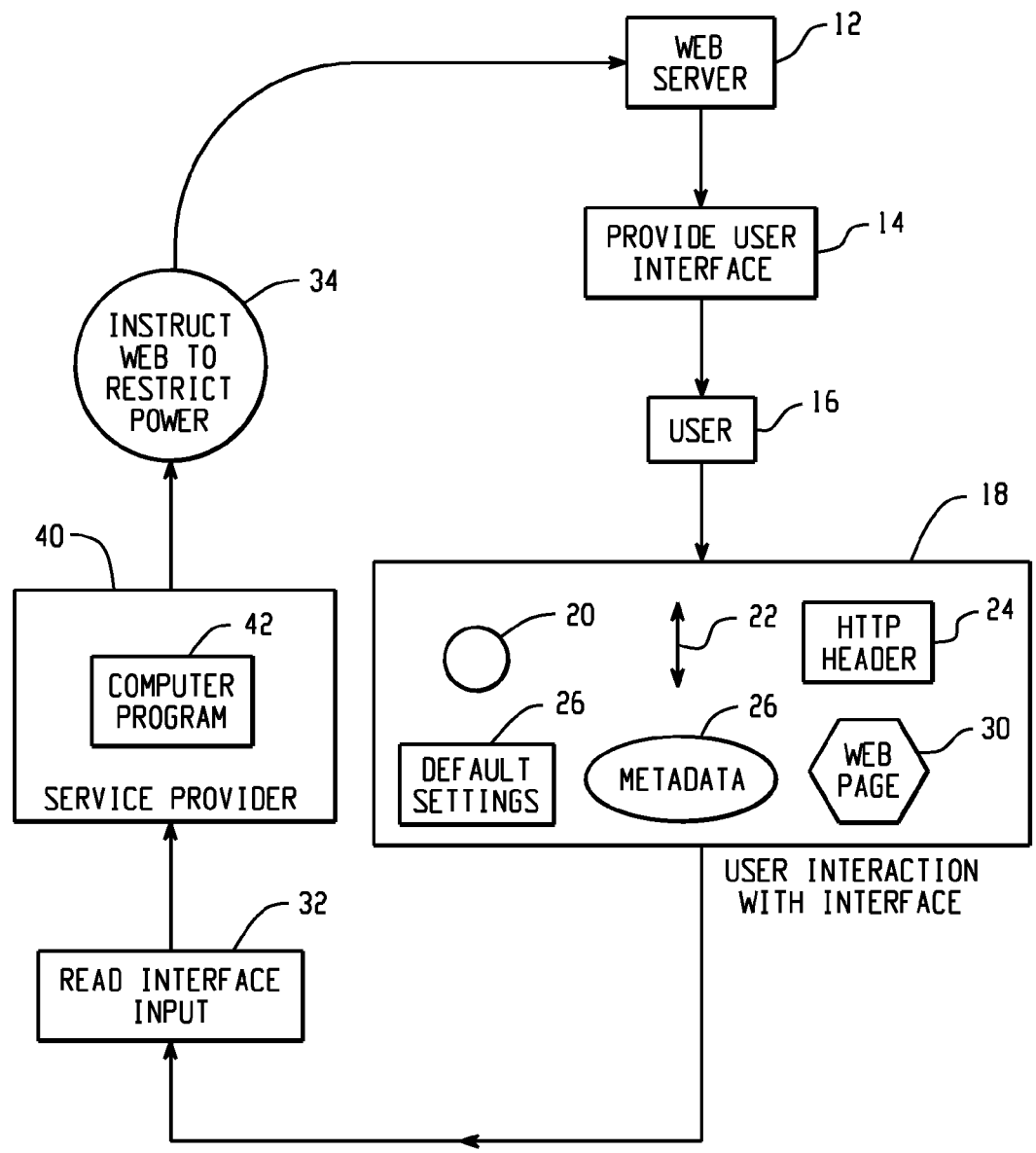
FIG. 2 shows the flow using a service provider.

Turning now to FIG. 2, the operative steps are similar to those of FIG. 1 except that a service provider 40 is interposed between the user selection and the web server 12. The service provider 40 is shown with its own computer program 42, it being understood that it can provide a level of service without necessarily having its own computer. Instead, it could arrange with the web server or the user to utilize the computing capabilities of either of these, or may work with an outside source for computer-related functions. The service provider 40 can be employed by the web server, the user, or by both, as mutually agreed upon. As before, the web server 12 provides an input interface at 14 for the user 16. The user 16 is then able to select from among the various options at 18 to transmit the users' instructions to the web server 12. However, instead of the instructions going directly to the server, they are read at 32 by the service provider 40. The service provider 40 then issues instructions to the web server 12 concerning the level of conservation that the user desires with respect to its compute loads.

For example, a user may select a button interface that communicates to the system that power conservation takes priority over performance. Alternatively, the sliding scaler 22 (e.g. dial or slider) may be used to enable the user to specify performance requirements. As another option, a default may be set as desired by the user, company, service provider, web-hosting service, operating system, or other third party. Further, the users' inclination to conserve energy may be presented to a web server as part of each request as an HTTP header. In yet another choice, the web server may parse that header to ascertain the degree to which the user wishes to conserve energy while fulfilling a request.

The interface may additionally present itself on individual web pages visited by the user. The user input may be stored as a site-specific cookie (metadata) enabling the setting to persist during future visits to this site. Profiles or policy tables may be used and traded among users, and these tables may specify settings for different energy use and power profiles.

Additionally, the user may specify an acceptable delay for web requests so that power may be conserved. The applicability of such delays may be illustrated in a real-world example. A given web user, e.g., a Customer Service Representative, may, while at the job, need the highest possible performance from servers to obtain customer information in the most timely manner. However, that same web user, during personal time may be willing to see response time (not counting transmission latencies) for a web retail site drop from 0.9 seconds to 2.2 seconds, in exchange for the knowledge that such delays are saving power in remote data centers. Currently, without the present invention, there exists no such manner for a user to specify a willingness select with suboptimal performance under certain conditions.

The user specifications may be used to reduce power consumption. Thresholds for acceptable performance may be adjusted according to preset or user-defined limits. User performance is measured to ensure continued acceptability. The specific implementation may take many forms.

For example, in one embodiment, user performance is reduced to delay the point at which new processors or grid nodes are brought online. Under various circumstances, this may or may not be the most efficient approach, but it is a convenient starting point to the implementation concepts. To illustrate further, all users see slightly lowered performance at all times if they state a preference for energy conservation over performance.

In another embodiment, user performance stays "optimal" until such a point that new processors or nodes need to be brought online. At this point, those users who specify "green" suffer performance degradation to a delay point at which new systems must be brought on-line. This approach is efficient as it provides optimal performance up until the threshold moment at which new processors or nodes are required to continue providing such performance. Only then is performance compromised for those users expressing such a willingness, so as to delay the point where new processors or nodes are allocated to the processing task.

In yet another embodiment, users who specify varying prioritization will be served from systems with varying clock speeds. In general, faster clock speeds adversely impact power consumption.

In still another embodiment, users who specify varying prioritization will be served on other systems employing various power reduction techniques, albeit at the cost of possibly reduced performance.

Prioritization at server level may be application-specific or user-specific. Of course, different users may specify different desires. For example, user A may specify to the web server "Go Green," while user B may specify "go fast" (a desire for performance), and user C may specify something intermediate. In the cases in which different servers are used, various user needs may be met with different servers. In the case, where only one server is available, decisions can be made according to many factors, such as a "majority rule" by the users or business for which the users work.

Computerized Implementation

Figure 3:
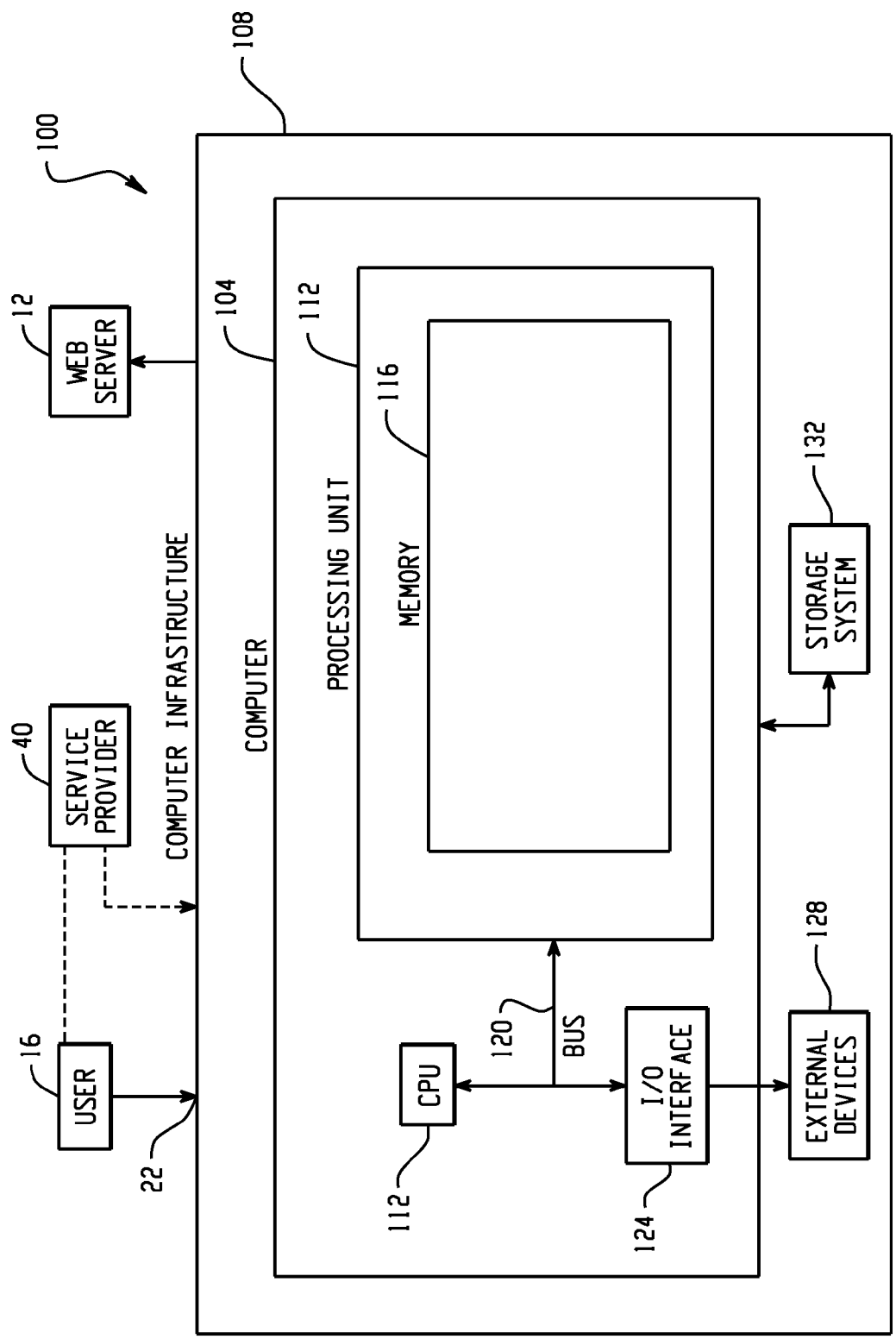
FIG. 3 is a block diagram illustrating an exemplary computerized system and method for implementing the present invention.

Referring now to FIG. 3, an exemplary computer system 100 of the invention implemented by a computer 104 deployed within a computer infrastructure 108 such as one existing at the information technology center of the web a service provider 40, a business firm, a manufacturing company or a governmental agency. This FIG. 3 is intended to demonstrate, among other things, that the operational steps of the present invention could be implemented within a network environment (e.g., the Internet, a wide area network (WAN), a local area network (LAN), a virtual private network (VPN), etc.), or on a stand-alone computer system.

In the case of the network environment, communication throughout the network can occur via any combination of various types of communication links. For example, the communication links can comprise addressable connections that may utilize any combination of wired and/or wireless transmission methods. Thus, a user 20 communicates with the computer infrastructure through an interface 22. The computer in turn communicates instructions from the user 20 to the web site 24.

Where communications occur via the Internet, connectivity could be provided by conventional TCP/IP sockets-based protocol, and an Internet service provider could be used to establish connectivity to the Internet. Still yet, computer infrastructure 108 is intended to demonstrate that some or all of the components of implementation could be deployed, managed, serviced, etc. by a service provider who offers to implement, deploy, and/or perform the functions of the present invention for others.

As shown, the computer 104 includes a processing unit 112, a memory 116, a bus 120, and input/output (I/O) interfaces 124. Further, the computer system 100 is shown in communication with external I/O devices/resources 128 and storage system 132. In general, the processing unit 112 executes computer program code, such as the code to implement various components of the computer 104, which is stored in memory 116 and/or storage system 132. It is to be appreciated that two or more, including all, of these components may be implemented as a single component.

While executing computer program code, the processing unit 112 can read and/or write data to/from the memory 116, the storage system 132, and/or the I/O interfaces 124. The bus 120 provides a communication link between each of the components in computer 100. The external devices 128 can comprise any devices (e.g., keyboard, pointing device, display, etc.) that enable a user to interact with computer system 100 and/or any devices (e.g., network card, modem, etc.) that enable computer system 100 to communicate with one or more other computing devices.

The computer infrastructure 108 is only illustrative of various types of computer infrastructures for implementing the invention. For example, in one embodiment, computer infrastructure 108 comprises two or more computing devices (e.g., a server cluster) that communicate over a network to perform the various process steps of the invention. Moreover, computer 104 is only representative of various possible computers that can include numerous combinations of hardware.

To this extent, in other embodiments, the computer system 100 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively.

Moreover, the processing unit 112 may comprise a single processing unit, or be distributed across one or more processing units in one or more locations, e.g., on a client site and with the server. Similarly, the memory 116 and/or the storage system 132 can comprise any combination of various types of data storage and/or transmission media that reside at one or more physical locations.

Further, I/O interfaces 124 can comprise any system for exchanging information with one or more of the external device 128. Still further, it is understood that one or more additional components (e.g., system software, math co-processing unit, etc.) not shown in FIG. 1 can be included in computer system 100. However, if computer 104 comprises a handheld device or the like, it is understood that one or more of the external devices 128 (e.g., a display) and/or the storage system 132 could be contained within computer 104, not externally as shown.

The storage system 132 can be any type of system (e.g., a database) capable of providing storage for information under the present invention. To this extent, the storage system 132 could include one or more storage devices, such as a magnetic disk drive or an optical disk drive. In another embodiment, the storage system 132 includes data distributed across, for example, a local area network (LAN), wide area network (WAN) or a storage area network (SAN) (not shown). In addition, although not shown, additional components, such as cache memory, communication systems, system software, etc., may be incorporated into the computer 104.

In the illustrated embodiment, the computer 104 communicates with external entities 136 such as another vehicle computing system, an external system communicating with the controller 112, other apparatuses external to the vehicle, etc. over a path 140, which may be wired (as shown) or wireless.

While shown and described herein as a method and a system, it is understood that the invention further provides various alternative embodiments. For example, in one embodiment, the invention provides a computer-readable/useable medium that includes computer program code to enable a computer infrastructure to perform the process steps of the invention. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), or on one or more data storage portions of a computing device, such as the memory 116 and/or the storage system 132 (e.g., a fixed disk, a read-only memory, a random access memory, a cache memory, etc.).

In another embodiment, the invention provides a business method that performs the process steps of the invention on a subscription, advertising, and/or fee basis. That is, a service provider could offer to manage the computer 104. In this case, the service provider can create, maintain, and support a computer infrastructure, such as the computer infrastructure 108 that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing the computer 104. In this case, a computer infrastructure, such as computer infrastructure 108, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer 104, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

The invention claimed is:

1. A method for specifying effecting power restriction for a quantum of energy used by a remote web service provider to serve a user, said power restriction based on an individual performance need and an energy-conservation profile of the user, said method comprising:
   providing a user-interactive interface;
   enabling a user to indicate a preference for power restriction with respect to web requests by the user; and
   instructing a web service provider to reduce power in response to a web request by the user;
   wherein the user specifies a reduction in overall power consumption for the user's needs, selected from at least one of the following:
   instructing the web service provider to use an energy-conserving server to handle the user's web requests;
   authorizing the web service provider to handle specified user requests at a lower priority;
   instructing the web service provider to handle the user's web requests without utilizing additional nodes and; central processing units;
   specifying an acceptable delay for fulfilling web requests; and
   selecting from among annotations on a web site for energy conservation.

2. The method according to claim 1 wherein the user issues instructions to the web service provider to reduce energy consumption when implementing the user's web requests by at least one of:
   using a button interface that communicates an instruction to the web service provider;
   using a sliding scale that specifies a performance requirements instruction;
   using a default setting;
   using an HTTP header instruction;
   using at least one metadata tag instruction; and
   using at least one policy table instruction that is traded among web users specifying settings for different energy users and power profiles.

3. The method according to claim 1 wherein the user interface comprises a graphical interface on a web browser, a graphical user interface on a computer of the user, a keyword entry by the user, or a speech entry of the user.

4. The method according to claim 1, wherein the user further specifies the reduction in overall power consumption for the user's needs by presenting the user's power reduction request to the web service provider as an HTTP header.

5. The method according to claim 1 further comprising providing a facility on the web service provider to store the user's power reduction requests.

6. The method according to claim 1, wherein the user further specifies a web request delay for power conservation.

7. A method for specifying a power restriction for a quantum of energy used by a remote web service provider to serve a user, said method comprising:
  enabling via a programmable device a user to indicate to a web service provider via a user-interactive interface a preference for power restriction with respect to serving a web request by the user; and
  instructing the web service provider to reduce power in response to serving the user's web request as a function of the indicated preference for power restriction by at least one of:
    instructing the web service provider to use an energy-conserving server to handle the user's web request;
    authorizing the web service provider to handle the user's web request at a lower priority than a priority of another request;
    instructing the web service provider to handle the user's web request without utilizing additional nodes and central processing units; and
    specifying an acceptable delay for fulfilling the user's web request.

8. The method of claim 7, wherein the step of instructing the web service provider to reduce power in serving the user's web request as the function of the indicated preference for power restriction further comprises:
  specifying a method for energy conservation in response to the user selecting a mark-up language annotation within a web page of the web service provider visited by the user.

9. The method of claim 8, further comprising:
  presenting the user-interactive interface to the user on the web page visited by the user; and
  storing the indicated preference for power restriction as a site-specific cookie with respect to the visited web site that persists during future visits to the site by the user.

10. The method of claim 9, wherein the specified acceptable delay for fulfilling the user's web request is a delay until a point in time at which a new processor or grid node is brought online by the web service provider.

11. The method of claim 10, wherein the indicated preference for power restriction specifies that the web service provider performance in serving the user's web request stays at an optimal level until the point in time at which the new processor or grid node is brought online by the web service provider, wherein the web service provider performance in serving the user's web request degrades to a green performance level that is less than the optimal level.

12. The method of claim 11, wherein the optimal level performance level is at a clock speed that is faster than a clock speed of the green performance level.

13. A method for providing a service specifying a power restriction for a quantum of energy used by a remote web service provider to serve a user, said method comprising:
  providing a computer infrastructure that:
    enables a user to indicate to a web service provider via a user-interactive interface a preference for power restriction with respect to a web request by the user; and
    instructs the web service provider to reduce power in response to the web request by the user as a function of the indicated preference for power restriction by at least one of:
      instructing the web service provider to use an energy-conserving server to handle the user's web request;
      authorizing the web service provider to handle the user's web request at a lower priority than a priority of another request;
      instructing the web service provider to handle the user's web request without utilizing additional nodes and central processing units; and
      specifying an acceptable delay for fulfilling the user's web request.

14. The method of claim 13, wherein the computer infrastructure instructs the web service provider to reduce power in serving the user's web request as the function of the indicated preference for power restriction by specifying a method for energy conservation in response to the user selecting a mark-up language annotation within a web page of the web service provider visited by the user.

15. The method of claim 14, wherein the computer infrastructure further:
  presents the user-interactive interface to the user on the web page visited by the user; and
  stores the indicated preference for power restriction as a site-specific cookie with respect to the visited web site that persists during future visits to the site by the user.

16. The method of claim 15, wherein the indicated preference for power restriction specifies that the web service provider performance in serving the user's web request stays at an optimal level until a point in time at which the new processor or grid node is brought online by the web service provider, wherein the web service provider performance in serving the user's web request degrades to a green performance level that is less than the optimal level.

17. A system, comprising:
  a processing unit, a computer readable memory and a tangible computer-readable storage device;
  wherein the processing unit, when executing program instructions stored on the computer-readable storage device via the computer readable memory:
  enables a user to indicate to a web service provider via a user-interactive interface a preference for power restriction with respect to a web request by the user; and
  instructs the web service provider to reduce power in response to the web request by the user as a function of the indicated preference for power restriction by at least one of:
    instructing the web service provider to use an energy-conserving server to handle the user's web request;
    authorizing the web service provider to handle the user's web request at a lower priority than a priority of another request;
    instructing the web service provider to handle the user's web request without utilizing additional nodes and central processing units; and
    specifying an acceptable delay for fulfilling the user's web request.

18. The system of claim 17, wherein the processing unit, when executing the program instructions stored on the computer-readable storage device via the computer readable memory, further instructs the web service provider to reduce power in serving the user's web request as the function of the indicated preference for power restriction by specifying a method for energy conservation in response to the user selecting a mark-up language annotation within a web page of the web service provider visited by the user.

19. The system of claim 18, wherein the indicated preference for power restriction specifies that the web service provider performance in serving the user's web request stays at an optimal level until a point in time at which the new processor or grid node is brought online by the web service provider, wherein the web service provider performance in serving the user's web request degrades to a green performance level that is less than the optimal level.

20. The system of claim 19, wherein the optimal level performance level is at a clock speed that is faster than a clock speed of the green performance level.

21. An article of manufacture, comprising:
a computer-readable tangible storage device having computer readable program code embodied therewith, the computer readable program code comprising instructions that, when executed by a computer processor, cause the computer processor to:
enable a user to indicate to a web service provider via a user-interactive interface a preference for power restriction with respect to a web request by the user; and
instruct the web service provider to reduce power in response to the web request by the user as a function of the indicated preference for power restriction by at least one of:
instructing the web service provider to use an energy-conserving server to handle the user's web request;
authorizing the web service provider to handle the user's web request at a lower priority than a priority of another request;
instructing the web service provider to handle the user's web request without utilizing additional nodes and central processing units; and
specifying an acceptable delay for fulfilling the user's web request.

22. The article of manufacture of claim 21, wherein the computer readable program code instructions, when executed by the computer processor, further cause the computer processor to instruct the web service provider to reduce power in serving the user's web request as the function of the indicated preference for power restriction by specifying a method for energy conservation in response to the user selecting a mark-up language annotation within a web page of the web service provider visited by the user.

23. The article of manufacture of claim 22, wherein the computer readable program code instructions, when executed by the computer processor, further cause the computer processor to:
present the user-interactive interface to the user on the web page visited by the user; and
store the indicated preference for power restriction as a site-specific cookie with respect to the visited web site that persists during future visits to the site by the user.

24. The article of manufacture of claim 23, wherein the specified acceptable delay for fulfilling the user's web request is a delay until a point in time at which a new processor or grid node is brought online by the web service provider.

25. The article of manufacture of claim 24, wherein the indicated preference for power restriction specifies that the web service provider performance in serving the user's web request stays at an optimal level until the point in time at which the new processor or grid node is brought online by the web service provider, wherein the web service provider performance in serving the user's web request degrades to a green performance level that is less than the optimal level.

* * * * *